United States Patent [19]

Harris

[11] Patent Number: 4,870,127

[45] Date of Patent: Sep. 26, 1989

[54] POLY (ALKYLENE CARBONATE) POLYAHLS HAVING ON THE AVERAGE UP TO ONE ACID-TERMINAL MOIETY AND SALTS THEREOF

[75] Inventor: Robert F. Harris, Midland, Mich.

[73] Assignee: The Dow Chemical Company, Midland, Mich.

[21] Appl. No.: 156,105

[22] Filed: Feb. 16, 1988

Related U.S. Application Data

[62] Division of Ser. No. 909,992, Sep. 22, 1986, Pat. No. 4,745,162.

[51] Int. Cl.$^4$ .................... C08L 69/00; B66D 1/14
[52] U.S. Cl. ......................................... 524/537; 252/351; 252/353; 252/354; 252/356; 252/DIG. 1; 525/461; 525/462; 525/466; 528/370; 549/231; 549/233; 549/247; 558/265; 558/266; 558/267; 558/268; 558/275
[58] Field of Search ............... 252/351, 353, 354, 356, 252/DIG. 1; 528/370; 558/267, 265, 266, 268; 525/461, 462, 466; 524/537; 549/231, 233, 247

[56] References Cited

U.S. PATENT DOCUMENTS 4,686,274  8/1987  Harris et al. ................. 528/196

Primary Examiner—Theodore E. Pertilla

[57] ABSTRACT

Novel acid-functional poly(alkylene carbonate) polyahls and their salts having surfactant activities are disclosed. These polyahls have, on the average, at least about 0.05 and up to about and including one hydrophilic terminus per molecule and can be produced by the reaction of a random non-ionic poly(alkylene carbonate) polyahl obtained by reacting a monofunctional alcohol, mercaptan, carboxylic acid, primary or secondary amine, alkyl substituted phenol or alkoxylates thereof with an alkylene carbonate and/or an alkylene oxide and/or carbon dioxide and/or a poly(alkylene carbonate) polyahl, and admixing a compound capable of adding an acidic end group thereto. Novel anionic poly(alkylene carbonate) polyahls are also disclosed. Surfactant compositions comprising the acid-functional polyahls of the invention and other non-ionic surfactants are also disclosed. Moreover, surfactant compositions comprising the novel acid-functional polyahls and other anionic surfactants are also disclosed.

14 Claims, No Drawings

POLY (ALKYLENE CARBONATE) POLYAHLS HAVING ON THE AVERAGE UP TO ONE ACID-TERMINAL MOIETY AND SALTS THEREOF

This is a divisional of application Ser. No. 909,992, filed Sept. 22, 1986, now U.S. Pat. No. 4,745,162 issued 5/17/88.

BACKGROUND OF THE INVENTION

1. Field of the Invention

The invention relates to polymeric, including oligomeric, compositions containing a poly(alkylene carbonate) backbone.

2. Background of the Invention

Poly(alkylene carbonate) polyahls are ranndomized polymers containing alkylene carbonate moieties and ether moieties such as di- and higher polyalkylenoxy units. An alkylene carbonate moiety is a repeating unit comprising an alkylene group bound to a carbonate moiety. Some of the known poly(alkylene carbonate) polyahls are non-ionic surfactants.

In 1978, DE 2,712,162 to Stuehler disclosed non-ionic surfactants containing carbonate in the backbone. A variety of surfactants have been prepared by Langdon and described in a series of patents. U.S. Pat. No. 4,072,704 described the coupling of polyethylene glycols and polypropylene glycols with either dialkyl carbonates or formaldehyde to give materials with surface active properties. In U.S. Pat. No. 4,353,834, it was described how long chain amides or sulfonamides have been coupled with hydrophilic polyglycols using dialkyl carbonates or esters of dicarboxylic acids to give materials with surface active properties. This work was extended in U.S. Pat. No. 4,504,418 to include polyoxyalkylene polymers and monofunctional aliphatic, aromatic or aliphatic-aromatic alcohols coupled by alkyl carbonates or esters of dicarboxylic acids to give materials with surface active properties.

U.S. Pat. No. 4,330,481 to Timberlake et al. described the preparation of surfactants by reacting alcohols or alcohol ethoxylates with ethylene carbonate. These products were then further reacted with ethylene oxide to produce different surface active materials as reported in U.S. Pat. No. 4,415,502. The preparation of surfactants and functional fluids by reacting alcohols, phenols or carboxylic acids (or their alkoxylated derivatives) with alkylene carbonates or alkylene oxides and carbon dioxide was described in U.S. Pat. No. 4,488,982 to Cuscurida.

U.S. Pat. No. 4,382,014 to Sakai et al. described the preparation of surface active materials by reacting alcohols, carboxylic acids or primary or secondary amines containing four or more carbon atoms or substituted phenols with alkylene carbonates in the presence of an -ate complex of a metal or Group II, III or IV of the Periodic Table having at least two alkoxyl groups.

Low molecular weight polyoxyethylene glycol monomethyl ethers have been coupled using phosgene or alkyl carbonates to give materials useful in formulating brake fluids and as synthetic lubricants, as disclosed in U.S. Pat. No. 3,632,828. The coupling of monofunctional alcohols, phenolics or their ethoxylated derivatives using diphenyl carbonate to give surfactants was disclosed in U.S. Pat. No. 3,332,980.

U.S. Pat. No. 4,267,120 to Cuscurida and Speranza describes novel polyester polycarbonates obtained by reacting a cyclic organic acid anhydride, a 1,2-epoxide carbon dioxide and a polyhydric compound in the presence of a basic catalyst. The resulting polyester polycarbonates are terminated with hydroxyl groups and are not acid-functional materials or surfactants.

These non-ionic surfactants contain a carbonate backbone which can be degraded by bases, strong acids or under biodegradative conditions. This makes these surfactants fugitive and biocompatible since they do not persist in the environment. Unfortunately, these non-ionic poly(alkylene carbonate) polyahl surfactants have limited applications due to their very poor water solubility and wetting times.

In addition, these non-ionic surfactants also form poor foams evidencing poor foam stability, which in specific instances may be an advantage or a disadvantage depending on the particular application. Also, fairly high concentrations of these non-ionic surfactants are required before any surface active properties, like lowering the surface tension of water, are evidenced.

In view of these shortcomings of poly(alkylene carbonate) polyahl surfactants, there still is a need for biodegradable surfactants having the ability to disperse in water and/or solubilize incompatible components.

SUMMARY OF THE INVENTION

In one aspect, the present invention is a novel acid-functional poly(alkylene carbonate) polyahl polymer which has on the average at least 0.5 and up to about one hydrophilic terminus per molecule. The hydrophilic terminus is preferably an acidic moiety such as -COOH, -SO$_2$H, -SO$_3$H, -SO$_4$H, -PO$_3$H$_2$ or -PO$_4$H$_2$ or sulfosuccinate. Salts of these polyahls such as alkali metal, alkaline earth metal, ammonium and amine salts are also included in the term acid-functional.

In another aspect of this invention, there is provided a poly(alkylene carbonate) polyahl comprising a reaction product of an adduct of at least one monofunctional alcohol, mercaptan, primary or secondary amine or carboxylic acid, C$_{3-24}$ alkyl substituted phenol or ethoxylates thereof with at least one member selected from the group consisting of (1) an alkylene carbonate, (2) an alkylene oxide and CO$_2$, (3) an alkylene oxide, an alkylene carbonate and carbon dioxide, and (4) a poly(alkylene carbonate) polyahl, and a material capable of reacting with said adduct to add on the average up to one terminal acidic group thereto. These compositions of matter have surface active properties.

This invention also provides salts of these random poly(alkylene carbonate) oligomers and polymers in the form of salts of the terminal acidic group. The salts of the polyahls also have surface active properties.

In another aspect of the invention, novel acid-functional poly(alkylene carbonate) polyahls and salts thereof are provided, which may be used by themselves or in a composition of matter further comprising additional non-ionic or anionic surfactants or salts thereof.

The novel compositions of this invention combine useful surfactant properties of non-ionic surfactants with improved properties obtainable from acid-functional surfactants. In these compositions, the combination of a poly(alkylene carbonate) polyahl backbone and a terminal acid-functional moiety renders these superior surfactants. The novel compositions can be used at concentrations much lower than the non-ionic polymers from which the present surfactants are derived, which provides a significant economic advantage in terms of materials and cost savings. These novel compositions also evidence increased water solubilities when compared with their non-ionic component. The superior characteristics of the novel polyahls permit new applications of the surfactants as well as easier handling thereof. Moreover, the increased surface active and water soluble characteristics of the present anionic polymers also result in decreased wetting times when compared with the non-ionic polymers. The present polymers also afford higher foam height and foam stabilities than those of the non-ionic poly(alkylene carbonate) polyahls.

One particularly useful characteristic of the surfactants of this invention is their ability to produce stable or readily dispersible water-based emulsions or dispersions of materials such as poly(alkylene carbonate) polyahls, polyether polyahls and polyester polyahls. These emulsions and dispersions provide a convenient low viscosity, readily pumpable system that can greatly facilitate the handling of such materials.

DETAILED DESCRIPTION OF THE INVENTION

Poly(alkylene carbonate) polyahls used in the preparation of the novel polymers of this invention are randomized polymers having a plurality of carbonate moieties and a plurality of active hydrogen moieties. An alkylene carbonate moiety is a repeating unit which has an alkylene group bound to a carbonate moiety. An active hydrogen moiety is a moiety containing an hydrogen atom which, because of its position in the moiety, displays significant activity according to the Zerewitnoff test described by Kohler et al., J. Amer. Chem. Soc. 49: 3181 (1927). Illustrative of such hydrogen moieties suitable for preparing the present polymers are aliphatic, alicyclic, aryl, alkylaryl, aralkyl and polyalkyleneoxy monofunctional alcohols, mercaptans, amides, carboxylic acids, primary and secondary amines and alkyl substituted phenols and ethoxylates thereof, among others. Alkyleneoxy moiety refers herein to a repeating unit which has an alkylene group bound to oxygen.

Alkylene carbonate and alkyleneoxy moieties may be respectively represented by the following formulae $$(C(R^2)_2\text{-}C(R^2)_2\text{-}OCO_2)$$

and $$(C(R^2)_2\text{-}C(R^2)_2\text{-}O)$$

wherein $R^2$ is as hereinafter defined.

The acid-functional polymers of this invention can be prepared from non-ionic poly(alkylene carbonate) polyahls produced by the process of co-pending U.S. application Ser. No. 885,118 filed on July 14, 1986, now abandoned, by the present inventor, which is herein incorporated in its entirety by reference, or by other known processes, followed by the addition thereto of an acid-terminal group. This is conveniently done by reacting the non-ionic polymer with an acid group donor, such as, in the case of -COOH, cyclic anhydrides, acid anhydrides, haloacids and the like.

Preferred acid-functional polymers of this invention may be prepared by reacting (1). adducts of (a) monofunctional alcohols, carboxylic acids, mercaptans, primary or seconds amines, $C_{3-24}$ alkyl substituted phenols or $C_2$–$C_{50}$ alkoxylates thereof, and (b) either alkylene carbonates, alkylene oxides and $CO_2$, a mixture of alkylene carbonates, alkylene oxides and $CO_2$ or poly(alkylene carbonate) polyahls with (2). materials capable of reacting with the adducts to add an acidic end group thereto.

Many of the adducts formed prior to the addition of the acid-functional moiety are known compositions and can be represented by the formula $$R^1\text{-}(X)_n\text{-}(Y)_m\text{-}(I)_k\text{-}OH$$

wherein $R^1$ is a residue from a $C_{4-30}$ monofunctional alcohol, mercaptan, carboxylic acid, primary or secondary amine, or $C_{3-24}$ alkyl substituted phenols or $C_2$–$C_{50}$ alkoxylates of a monofunctional alcohol, mercaptan, carboxylic acid, primary or secondary amine or alkyl phenol, X is separately in each occurrence $-ZCOOC(R^2)_2-C(R^2)_2-O-C(R^2)_2-C(R^2)_2-$ when alkylene carbonates or alkylene oxides and $CO_2$ are used, wherein Z is O, S, NH, or $NR^3$, and $R^3$ is $C_{1-24}$ alkyl, Y is separately in each occurrence $-O-C(R^2)_2-C(R^2)_2-$ when alkylene carbonates or alkylene oxides and $CO_2$ are used, $R^2$ is separately in each occurrence hydrogen, $C_{1-20}$ alkyl, $C_{7-20}$ aralkyl, $C_{6-20}$ aryl, $C_{7-20}$ alkylaryl, $C_{1-20}$ alkenyl or inertly substituted $C_{1-20}$ hydrocarbon, I is a residue of an initiator if a separate initiator is used to form the poly(alkylene carbonate) polyahl, as is the case in the process described in co-pending U.S. application Ser. No. 885,118, or a residue of a modifier if the poly(alkylene carbonate) polyahl is produced as in co-pending U.S. application Ser. Nos. 799,211 filed on Nov. 18, 1985, now U.S. Pat. No. 4,686,273, and 809,675 filed on Dec. 16, 1985, now U.S. Pat. No. 4,686,274, which are all herein incorporated in their entireties by reference. I is preferably the residue of a polyfunctional $C_{4-30}$ alcohol, amine or mercaptan, n is separately in each occurrence between 1 and 40, m is separately in each occurrence between 0 and 200, and k is separately in each occurrence between 0 to 8; with the proviso that X, Y and I are randomly spaced in the polymer backbone.

As indicated hereinabove, the starting materials for the preparation of the acid-functional polymers of this invention are poly(alkylene carbonate) polyahls formed from a monofunctional alcohol, mercaptan, carboxylic acid, primary or secondary amine, $C_{3-24}$ alkyl phenols or alkoxylates thereof, and alkylene carbonate and/or ethylene oxide and $CO_2$ and/or alkylene carbonate, alkylene oxide and $CO_2$ and/or a poly(alkylene carbonate) polyahl, and a donor capable of reacting with the adduct to add a terminal acidic moiety to the polymer.

Useful monofunction alcohols particularly suited for the practice of this invention are $C_4$–$C_{30}$ alkyl alcohols and their $C_2$–$C_{50}$ alkoxylate derivatives, although others may also be used. Alkoxylates can be formed by reacting alcohols with alkylene oxides. Preferred monofunctional alcohols are $C_4$–$C_{24}$ alkyl alcohols, still more preferred monofunctional alcohols are $C_6$–$C_{20}$ alkyl alcohols and the most preferred monofunctional alcohols are $C_8$–$C_{18}$ alkyl alcohols, such as octanol, dodecanol, tetradecanol, hexadecanol and octadecanol.

Suitable monofunctional mercaptans for the synthesis of the present non-ionic polymers are $C_{4-30}$ alkyl mercaptans and their $C_2$–$C_{50}$ alkoxylate derivatives, although others may be used. Alkoxylates can be formed by reacting mercaptans with alkylene oxides. Preferred monofunctional mercaptans are $C_{4-24}$ alkyl mercaptans, more preferred are $C_{6-20}$ alkyl mercaptans, and the most preferred are $C_{8-18}$ alkyl mercaptans such as octylmercaptan, dodecylmercaptan and octadecylmercaptan. However, other mercaptans can also be used. Non-ionic polymer compositions based on monofunctional mercaptans are described in co-pending U.S. application Ser. No. 885,118 filed on July 14, 1986 by the present invention.

As monofunctional carboxylic acids for the synthesis of the non-ionic poly(alkylene carbonate) polyahls, $C_4$–$C_{30}$ alkyl carboxylic acids and thier $C_2$–$C_{50}$ alkoxylate derivatives, among others, may be used. Alkoxylates can be formed by reacting carboxylic acids with alkylene oxides. Preferred are $C_4$–$C_{24}$ alkyl carboxylic acids, more preferred are $C_6$–$C_{20}$ alkyl carboxylic acids, and the most preferred are $C_8$–$C_{18}$ alkyl carboxylic acids such as lauric acid, stearic acid and oleic acid. However, other carboxylic acids may also be employed.

Suitable monofunctional primary amines for the synthesis of the present non-ionic polymers are $C_4$–$C_{30}$ alkylamines and their $C_2$–$C_{50}$ alkoxylate derivatives, among others. Preferred are $C_4$–$C_{24}$ alkylamines, still more preferred are $C_6$–$C_{20}$ alkylamines, and the most preferred are $C_8$–$C_{18}$ alkylamines such as octylamine, dodecylamine, tetradecylamine, hexadecylamine and octadecylamine. However, other primary amines may also be used. Alkoxylates can be formed by reacting amines with alkylene oxides.

As monofunctional secondary amines $C_4$–$C_{30}$ dialkylamines and their alkoxylate derivatives are suitable. Preferred secondary amines are $C_4$–$C_{24}$ dialkylamines, still more preferred are $C_6$–$C_{20}$ dialkylamines, and the most preferred are $C_8$–$C_{18}$ dialkylamines such as N,N-dioctylamine, N,N-didodecylamine, N-octyl, N-decylamine, N-methyl, N-dodecylamine, N-methyl, N-octadecylamine and N-methyl, N-oleylamine, but others may also be used.

Suitable monofunctional alkyl phenols are $C_3$–$C_{30}$ alkyl substituted phenols and $C_2$–$C_{50}$ alkoxylates thereof. More preferred are $C_3$–$C_{24}$ alkyl substituted phenols, still more preferred are $C_3$–$C_{18}$ alkyl substituted phenols, and most preferred are $C_4$–$C_{12}$ alkyl substituted phenols. However, other monofunctional phenols or alkoxylates thereof may also be used within the confines of this invention. Alkoxylates can be formed by reacting alkenols with alkylene oxides.

The hereinabove monofunctional compounds may also contain other substituents such as halo, cyano, nitriles, nitro alkoxy groups, alkenes, thioalkyl, tertiary amino which are inert to reaction conditions.

Thus, in the hereinabove chemical structure, $R^1$ is preferably a monovalent hydrocarbon radical which may be substituted with hydrogen, lower alkyl, alkyleneoxy and non-reactive substituents including O, N or S. $R^1$ is more preferably an aliphatic, alkyleneoxy, cycloaliphatic, aryl, alkylaryl or arylalkyl hydrocarbyl residue containing one or more oxygen, nitrogen or sulfur moieties. $R^1$ is still more preferably a monovalent alkane, alkyleneoxy or cycloalkane which is substituted with hydrogen or one or more oxygen, nitrogen or sulfur moieties. $R^1$ is even more preferably a monovalent $C_6$–$C_{18}$ aliphatic or $C_6$–$C_{30}$ cycloaliphatic hydrocarbon.

$R^2$ is preferably hydrogen, $C_{1-20}$ alkyl, $C_{1-20}$ haloalkyl, $C_{1-20}$ alkenyl or $C_{6-20}$ phenyl, more preferably hydrogen, $C_{1-3}$ alkyl, $C_{2-3}$ alkenyl, or phenyl, even more preferably hydrogen, methyl or ethyl, still more preferably hydrogen or methyl, and most preferably, hydrogen.

Each $R^2$ may also separately be in each occurrence hydrogen, halogen, nitro, cyano, $C_{1-20}$ hydroxycarbyl substituted with hydrogen or one or more of halo, cyano, nitro, thioalkyl, tert-amino, $C_{1-18}$ alkoxy, $C_{6-18}$ aryloxy, $C_{7-20}$ aralkoxy, carbonyl dioxy($C_{1-18}$)alkyl, carbonyl dioxy($C_{6-20}$)aryl, carbonyl dioxy($C_{7-24}$)aralkyl, $C_{1-18}$ alkoxy carbonyl, $C_{6-18}$ aryloxycarbonyl, $C_{7-20}$ aralkoxycarbonyl, $C_{1-18}$ alkylcarbonyl, $C_{6-20}$ aralcarbonyl, $C_{7-20}$ aralkylcarbonyl, $C_{1-18}$ alkylsulfinyl, $C_{6-20}$ arylsulfinyl, $C_{7-20}$ aralkylsulfinyl, $C_{1-18}$ alkylsulfonyl, $C_{6-20}$ arylsulfonyl or $C_{7-20}$ aralkylsulfonyl.

I is a residue of the initiator used to make the poly(alkylene carbonate) polyahl. I is, typically, the residue from a polyahl such as a polyfunctional alcohol, mercaptan or amine. Polyfunctional alcohols include polyols such a glycerine, ethylene glycol, 1,4-butanediol, polyether polyols, polyester polyols and hydroxy-functional acrylic polymers. Polyfunctional mercaptans include 1,6-hexanedithiol, 1,12-dodecanedithiol and 1,18-octadecanedithiol. Polyfunctional amines include 1,6-diaminohexane and 1,12-diaminododecane. However, other initiators may also be used within the confines of this invention.

The non-ionic poly(alkylene carbonate) polyahls obtained from monofunctional alcohols, carboxylic acids or primary or secondary amines, or alkyl phenols or alkoxylates thereof with alkylene carbonate or alkylene oxides and $CO_2$ can be formed by any method known in the art without any compositional limitations. Alcohol-initiated reactions of alkylene oxides and $CO_2$ are operational within the context of this invention.

The non-ionic polymers may also be prepared by the methods described in co-pending U.S. applications Ser. Nos. 750,362 filed July 1, 1985, 885,118 filed July 14, 1986, 799,211 filed Nov. 18, 1985 and 809,675 filed Dec. 16, 1985, by the same inventor, which are all herein incorporated in their entireties by reference.

The proportion of X to Y in the poly(alkylene carbonate) polyahl is determined by the process used and the molar proportion of the reactants, as well as the reaction conditions such as temperature, time, catalyst and catalyst concentration. The thus-formed non-ionic poly(alkylene carbonate) polyahls are random polymers, wherein the proportion of X, Y and I and the length of the polymer is determined by the values of n, m and k. The values of n, m and k may thus be used to vary the average molecular weight of the adducts.

Preferred values of n are 1 to 40, still more preferred are between 1 and 20, and most preferred are between 1 and 10. Preferred values of m are 0 to 200, more preferred are between 0 and 100, and still more preferred are between 0 and 50. Preferred k values are between about 0 and 8, more preferably between about 0 and 3, and still more preferably between about 0 and 1.

A preferred average molecular weight of the polymers is between about 300 and 10,000, more preferably between about 300 and 5000, and still more preferably between 500 and 3000.

Suitable acid-terminal moieties are —COOH, —$SO_2H$, —$SO_3H$, —$SO_4H$, —$PO_4H_2$, or —$PO_3H_2$, or sulfosuccinate.

The novel acid-functional poly(alkylene carbonate) polyahls of this invention are represented by the following structural formula.

$$R^1—(X)_n—(Y)_m—(I)_k—O—A$$

wherein $R^1$, X, Y, I, n, m and k are as previously defined and A is an acid functional moiety.

In an embodiment of this invention A is represented by the formula $$—(R^4)_g—B$$

wherein $R^4$ is an alkylene, carbonylalkylene, alkenylene, carbonylalkenylene, ($C_{5-8}$) arylene, or cycloalkenylene, and B is the acid-terminal moiety.

The acid donors capable of reacting with the poly(alkylenecarbonate) polyahls to add a terminal acidic group thereto may be selected from a large number of compounds known in the art. By means of example, the following are provided.

Cyclic anhydrides selected from the group consisting of alkylcyclic anhydrides, cycloalkylcyclic anhydrides, arylcyclic anhydrides, alkylarylcyclic anhydrides and aralkylcyclic anhydrides. Among these, the more preferred are $C_{4-25}$ alkylcyclic anhydrides, $C_{8-24}$ cycloalkylcyclic anhydrides, $C_{8-24}$ aralkylcyclic anhydrides and $C_{8-24}$ alkylarylcyclic anhydrides. The anhydrides may be further substituted with halogens, alkyl, alkyl carbonyl and aryl, among other substituents. Examples include succinic anhydride, maleic anhydride, phthalic anhydride, bromomaleic anhydride, dichloromaleic anhydride, dimethylmaleic anhydride, dimethylsuccinic anhydride, 2-dodecen-1-yl succinic anhydride, glutaric anhydride, heptanoic anhydride, hexanoic anhydride, homophthalic anhydride, 3-methylglutaric anhydride, methylsuccinic anhydride and 2-phenylglutaric anhydride. The most preferred anhydrides are succinic anhydride, maleic anhydride and phthalic anhydride. However, any anhydride can be used which is capable of reacting with a monofunctional alcohol, mercaptan, carboxylic acid or primary or secondary amine to provide a terminal carboxylic acid moiety.

The formation of sulfosuccinates is a special case of cyclic anhydride reactions. A poly(alkylene carbonate)-polyahl is allowed to react with maleic anhydride and sodium bisulfite. The sulfosuccinate moiety has the following structure:

$$—CH_2CH—CO_2H$$
$$\phantom{—CH_2CH—}|$$
$$\phantom{—CH_2CH—}SO_3H$$

Other types of compounds capable of adding a terminal acidic group to the non-ionic polymers are compounds containing sulfonic acid, sulfinic acid or sulfuric acid terminal moieties and their salts. By means of example, halosulfonic acids and salts thereof, such as chlorosulfonic acid, sodium chlorosulfonate and chloroethylsulfonic acid can be used. Preferred among these are chlorosulfonic acid, chlorosulfinic acid and chloroethylsulfinic acid.

Still another group of compounds capable of adding an acidic group to a polymer to form the present acid-functional polymers are halocarboxylic acids and salts thereof such as chloroacetic acid, sodium chloroacetate, bromoacetic acid, and chloropropionic acid. Most preferred is monochloroacetic acid. Still another group of compounds capable of adding a terminal acidic group are inorganic acid anhydrides such as $P_2O_5$ and $SO_3$.

In general, any compound capable of adding a terminal acidic group to non-ionic poly(alkylene carbonate) polyahls without degrading such adduct is suitable for use within the present context.

The addition of the acidic terminal group to the poly(alkylene carbonate) polyahl is dependent on the nature of the acid material and the monofunctional material used.

By means of example, the reaction of the substrate polyahls with a carboxylic acid moiety-adding compound will be described in general terms. However, the general requirements are extendable to the reactions adding to the polyahls other terminal acid-functional groups, as well.

Cyclic carboxylic acid anhydrides are the most preferred class of materials used to add a terminal acidic group.

Reaction is carried out by contacting a poly(alkylene carbonate) polyahl as defined above with a cyclic carboxylic acid anhydride at temperatures from about 80° C. to 180° C. for a period of minutes to about hours. Optionally, a basic catalyst such as an alkali metal or alkaline earth metal carbonate, alkoxide, stannate or borate, or a tertiary amine can be used to increase reaction rate, if desired. Preferably, a catalyst is not used, thereby eliminating the need for catalyst removal after reaction.

The molar ratio of active hydrogen groups on the poly(alkylene carbonate) polyahl to the cyclic carboxylic acid anhydride can be about 1:1 or greater, provided that no more than one acid moiety is incorporated per molecule.

The reaction which chemically incorporates a carboxylic acid-functional moiety on the end of the poly(alkylene carbonate) polyahl is preferably carried out in the absence of a solvent and the product can be used for many applications without further purification. The reaction may, however, be conducted in the presence of inert solvents, if desired. Conversion of the cyclic carboxylic acid anhydride is near 100% in most cases.

When haloacids are used as the source of the acid moiety, they can be added to the poly(alkylene carbonate) polyahl in a solvent, such as methylene chloride, in the presence of a compound capable of acting as an acid acceptor, such as pyridine or triethylamine. The thus obtained product can be recovered after neutralization, removal of byproduct salt and solvent stripping.

A variety of known neutralizing substances can be used to obtain the salts of the novel acid-functional polymers, such as alkali metal salts, alkaline earth metal salts, amine salts such as alkyl ammonium, cycloalkyl ammonium, alkylaryl ammonium, aryl ammonium and aralkyl ammonium salts, and ammonium salts.

The choice of the particular neutralizing agent used depends in large part on which particular salt is required for a specific application, since different salts may have widely different compatibilities with other materials in end use applications. Amines such as ammonia, methylamine, dimethylamine, trimethylamine, ethylamines, propylamines, butylamines and longer chain alkylamines (up to $C_{20}$ alkylamines) are one preferred class of materials. However, others outside of this range may also be used. Among the alkali metal salts lithium, sodium and potassium are most preferred. Among the alkaline earth metal salts calcium and magnesium are most preferred.

The method of neutralizing the acid-functional poly(alkylene carbonate) polyahl is important. When strong bases such as alkali metal hydroxides are used, it is important that local excesses of the hydroxides are never present during the neutralization since such conditions lead to hydrolysis of the poly(alkylene carbonate) polyahl backbone. Amines such as ammonia are particularly useful since local excesses do not lead to backbone hydrolysis. Typically, the neutralizing agent is added slowly to the acid-functional poly(alkylene carbonate) polyahl while monitoring the pH of the product. In this way any desired percentage of the acid moieties can be neutralized up to 100%.

The characteristics of the novel acid-functional poly(alkylene carbonate) polyahl polymers including their salts can be modified by adjusting the proportion of non-ionic poly(alkylene carbonate) polyahl to the acid group donor compound. A different proportion of ionic to non-ionic characteristics may be desirable depending on the particular application the polymer is utilized for. Thus, when a polymer product having a high anionic characteristic is desired, the ratio of non-ionic polymer to acid group donor may be about 1:1. This will provide a complete conversion of the non-ionic polymer to the anionic polymer.

However, other applications may require a different balance of non-ionic and anionic surfactant capabilities. In such cases a partial conversion of the non-ionic polymer to the acid-functional form may be desirable, whereby some non-ionic and some acid-functional moieties are present in the product. The proportion of non-ionic polymer to acid group donor may be as high as desired, particularly in cases where only a slight anionic characteristic is desired. A proportion of about 20:1 of non-ionic polymer to acid group is within the confines of the invention. A particularly useful range of proportions of the non-ionic polymer to the acid group donor is between about 4:1 and 1:1, more preferably between about 1.5 and 1:1.

The characteristics of the novel acid-functional polymers and their salts can be varied by adjusting, for example, the proportion of monofunctional compound in the polymer backbone to alkylene carbonate and/or alkylene glycol moieties in the polymer backbone, the polymer molecular weight, the composition of acid-functional group present, the amount of acid-functional group present as a salt and the composition of the cationic portion of the salt.

In some cases, a mixture of the present acid-functional polymers with a different non-ionic polymer may be the more suitable solution. For such purposes, an additional non-ionic surfactant may be physically blended in after the present anionic surfactant is prepared. Useful for this application are non-ionic poly(alkylene carbonate) polyahls utilized as starting materials herein or other known poly(alkylene carbonate) polyahls. Also suitable are other non-ionic polymers such as the modified poly(alkylene carbonate) polyahls described in co-pending U.S. applications Ser. Nos. 809,675 filed on Dec. 16, 1985, or 799,211 filed on Nov. 18, 1985, by the same inventor, which are herein incorporated in their entireties by reference. Other nonionic materials can be used in combination with the present ionic surfactants such as polyether polyahls, polyester polyahls, alcohol ethoxylates and phenolic ethoxylates.

The surfactants of this invention can also be used in combination with other anionic surfactants. Examples of such anionic surfactants include carboxylic acids, oxyacetates, sulfonates, ether sulfates, phosphates, sulfosuccinates and their salts.

The present anionic surfactants are used in significantly smaller quantities than the corresponding nonionic surfactants for a variety of applications. When the anionic surfactants are utilized to lower the surface tension of water, only a 10 weight % fraction of the required nonionic surfactant is needed in many cases.

When used by themselves, they can be effective in amounts between about 0.0002 wt % and about 10 wt %. Preferably they are added in amounts between about 0.0005 wt % and about 2 wt % of the total volume, and still more preferably between about 0.001 wt % and about 1 wt %.

When used in a composition with other surfactants, the novel polyahls are incorporated in amounts between about 0.0002 wt % and about 5 wt % of the final volume, more preferably between about 0.0005 wt % and about 2 wt %, and still more preferably between about 0.001 wt % and about 1 wt %. However, the amount of the present surfactants incorporated into such compositions may also be varied outside of the hereinabove stated range as appropriate or required for different applications.

The amounts of other surfactants incorporated in the compositions can also be varied in accordance with the specific application for which they are intended. Such amounts of other surfactants are generally about the same as the amounts listed in the preceding paragraph for the surfactants of this invention.

Having now described the invention in general terms, the following examples are included for illustrative purposes only, and are not meant to limit the scope of the invention or the claims. Unless otherwise stated, all parts and percentages are by weight.

EXAMPLES

Example 1

Reaction Products of Ethylene Carbonate (EC) with Alcohols

These are prepared by known procedures, e.g., Timberlake, U.S. Pat. No. 4,330,481. The desired molar ratio of EC and alcohol (see Table 1 hereinbelow) are heated with stirring under a nitrogen atmosphere in the presence of sodium stannate trihydrate (1.0 wt %) as catalyst to a high EC conversion. After the reaction is complete, the catalyst is removed by stirring the product (20 wt % in acetone) with Fluorosil (1 g/10 lg product) for 3 hours, followed by filtration and solvent removal. The characteristics of the products are described in Table 1.

TABLE 1

Reaction Products of Ethylene Carbonate with Alcohols

| Sample Number | Initiator | EC Initiator Ratio | Reaction Time (hrs) | Reaction Temp. (°C.) | EC Conversion (%) |
|---|---|---|---|---|---|
| A | n-butanol | 10 | 25 | 160 | 99.6 |
| B | n-hexanol | 10 | 25½ | 150 | 98.0 |
| C | n-octanol | 10 | 22 | 160 | 100.0 |
| D | n-decanol | 10 | 22 | 160 | 99.4 |
| E | n-dodecanol | 5 | 21½ | 160 | 100.0 |
| F | n-dodecanol | 10 | 21½ | 160 | 100.0 |
| G | n-dodecanol | 20 | 23½ | 160 | 96.5 |

Example 2

Reaction Product of EC:n-Octanol (10:1) Adduct with Succinic Anhydride

Ethylene carbonate (331.95 g, 3.768 mol) and n-octanol (49.07 g, 0.3768 mol) are added to a 500 ml, 3-necked flask equipped with a stirrer, condenser, thermometer and temperature controller and maintained under a nitrogen atmosphere. The reactor is heated to 175° C. and sodium stannate trihydrate (3.81 g, 1.0 wt%) is added as catalyst. The reaction is terminated after 7 hours at 175° C. The EC conversion was 97.5%.

A portion of the above EC:n-octanol product (226.1 g, 0.30 mol hydroxyl) and succinic anhydride (30.0 g, 0.30 mol) are combined in the same reaction apparatus used above and are heated for one hour at 120° C. Proton NMR and capillary gas chromatrographic analysis both indicate 100% conversion of succinic anhydride. The catalyst is removed by treating a solution of the product in acetone (20 wt %) with Fluorosil (1 g/10 g product), stirring for 3 hours, filtering and removing the solvent on a rotary evaporator. The adduct is a straw-colored viscous liquid.

The results of NMR analysis are as follows:

| 0.7–1.8 | δ (multiplet, | $CH_3(CH_2)_6$—, | 1.00) |
|---|---|---|---|
| 2.9–3.1 | δ (singlet, | —$O_2CCH_2CH_2CO_2$—, | 0.94) |
| 3.4–4.0 | δ (multiplet, | —$CH_2OCH_2$—, | 6.39) |
| 4.1–4.5 | δ (multiplet, | —$CH_2OCO_2CH_2$—, | 4.23) |

The IR data are consistent with the assigned structure. $\overline{M}_n=552$, $\overline{M}_w=1,101$, PDI=1.99. Titration: 1.105 meq $CO_2H/g$.

A portion of the adduct is converted to its 2-hydroxyethylamine salt as follows. The adduct (2.50 g) and 100 ml deionized water are added to a 4-oz bottle and shaken. A insoluble sticky white solid is obtained. 2-Hydroxyethylamine is then added dropwise with stirring while monitoring the pH. When the pH reaches 6.20 the content of the bottle are washed into a 250 ml volumetric flask with deionized water. The salt is very water soluble (2.50 g non-ionic surfactant/250 g=1.00 wt % anionic surfactant).

The surface tension is studied as a function of concentration. The results obtained are summarized in Table 2 hereinbelow.

TABLE 2

| | Surface Tension (dynes/cm) | |
|---|---|---|
| Concentration (wt % in deionized water) | Anionic Surfactant (2-hydroxyethylamine salt) | Non-ionic Surfactant Precursor |
| 1.0 | 31.2 | Not soluble |
| 0.4 | 32.2 | Not soluble |
| 0.1 | 35.3 | 32.2 |
| 0.04 | 35.4 | 37.3 |
| 0.01 | 39.9 | 44.3 |
| 0.004 | 39.2 | 60.0 |
| 0.002 | 39.0 | 61.7 |

These results show that the anionic surfactant of this invention has a greater than 10 fold water solubility when compared to the non-succinic anhydride capped analog and has good surface activity at less than 1/10 the concentration of the non-capped analog.

Example 3

Reaction Product of EC:n-Dodecanol (10:1) Adduct with Succinic Anhydride

Ethylene carbonate (310.50 g, 3.524 mol), n-dodecanol (65.67 g, 0.352 mol) and sodium stannate trihydrate (3.76 g, 1.0 wt %) are combined in the same reaction system used in Example 2 above. The reaction vessel is then heated for 6 hours at 175° C. The EC conversion is 95.7%.

A portion of the above EC:n-dodecanol product (243.0 g, 0.30 mol hydroxyl) and succinic anhydride (30.0 g, 0.30 mol) are combined in the same reaction apparatus used in Example 2 above and heated for 1 hour at 120° C. Proton NMR and capillary gas chromatographic analysis both indicate 100% conversion of succinic anhydride. The catalyst is removed as in Example 2 above. The adduct is a straw-colored viscous liquid.

The NMR analysis is as follows:

| 0.7–1.9 | δ (multiplet, | $CH_3(CH_2)_{10}O$—, | 1.00) |
|---|---|---|---|
| 2.6–2.8 | δ (singlet, | —$O_2CCH_2CH_2CO_2$—, | 0.99) |
| 3.5–4.0 | δ (multiplet, | —$CH_2OCH_2$—, | 5.81) |
| 4.1–4.5 | δ (multiplet, | —$CH_2OCO_2CH_2$—, | 4.18) |

The IR spectrographic data are consistent with the assigned structure. $\overline{M}_n=611$, $\overline{M}_2=1044$, PDI=1.71. Titration: 1.103 meq $CO_2H/g$.

Example 4

Reaction Product of EC:n-Butanol (10:1) Adduct with Succinic Anhydride

Ethylene carbonate (180.87 g, 2.053 mol), n-butanol (15.22 g, 0.2053 mol) and sodium stannate trihydrate (1.96 g, 1.0 wt %) are combined in the same reaction apparatus setup used in Example 2 above except that a 250 ml flask is used. The reaction vessel is heated for 20.5 hours at 150° C. The EC conversion obtained is 95.0%.

A portion of the above EC:n-butanol product (144.0 g, 0.20 mol hydroxyl) and succinic anhydride (20.0 g, 0.20 mol) are combined in the same reaction setup used above and heated for one hour at 120° C. Proton NMR and capillary gas chromatographic analysis both indicates 100% conversion of the succinic anhydride. The catalyst is removed as in Example 1 above. The adduct obtained is a straw-colored viscous liquid.

The NMR analysis is as follows:

| 0.7–1.9 | δ (multiplet, | $CH_3(CH_2)_2$—, | 1.00) |
|---|---|---|---|
| 2.6–2.8 | δ (singlet, | —$O_2CCH_2CH_2CO_2$—, | 1.06) |
| 3.5–4.0 | δ (multiplet, | —$CH_2OCH_2$—, | 6.27) |
| 4.1–4.5 | δ (multiplet, | —$CH_2OCO_2CH_2$—, | 5.64) |

The IR spectrum is consistent with the assigned structure. $\overline{M}_n=589$, $\overline{M}_w=1,030$, PDI=1.75. Titration: 1.159 meq $CO_2H/g$.

Example 5

Reaction Product of EC:n-Octanol (10:1) Adduct with Maleic Anhydride

Ethylene carbonate (175.54 g, 1.993 mol), n-octanol (25.95 g, 0.1993 mol) and sodium stannate trihydrate (2.02 g, 1.0 wt %) are combined in the reaction system used in Example 4 above. The reaction vessel is heated for 16 hours at 150° C. The EC conversion is 87.0%.

A portion of the above EC:n-octanol product (155.2 g, 0.19 mol hydroxyl) and maleic anhydride (18.63 g, 0.19 mol) are combined in the same reaction apparatus used above and heated for one hour at 120° C. Proton NMR and capillary gas chromatographic analyses both indicate 100% conversion of the maleic anhydride. The catalyst is removed as in Example 2 above. The adduct obtained is a straw-colored viscous liquid.

The NMR analysis was as follows:

| 0.7–1.8 | δ (multiplet, | CH$_3$(CH$_2$)$_6$—, | 1.00) |
| --- | --- | --- | --- |
| 3.5–3.9 | δ (multiplet, | —CH$_2$OCH$_2$—, | 5.23) |
| 4.1–4.5 | δ (multiplet, | —CH$_2$OCO$_2$CH$_2$—, | 4.77) |
| 6.2–6.3 | δ (singlet, | —O$_2$CCH=CHCO$_2$—, | 0.91) |

The IR spectrographic data is consistent with the assigned structure. Titration: 1.028 meq CO$_2$H/g.

Example 6

Reaction Product of EC:Oleyl Alcohol (10:1) Adduct With Succinic Anhydride

Ethylene carbonate (153.76 g, 1.745 mol), oleyl alcohol (46.77 g, 0.1745 mol) and sodium stannate trihydrate (2.00 g, 1.0 wt %) are combined in the reaction apparatus used in Example 4 above. The reaction vessel is heated for 23 hours at 150° C., resulting in 95.1% conversion of EC.

A portion of the above EC:oleyl alcohol product (158.0 g, 0.17 mol hydroxyl) and succinic anhydride (17.0 g, 0.170 mol) are combined in the apparatus used above and heated for one hour at 120° C. Proton NMR and capillary gas chromatographic analyses, both indicate 100% conversion of the succinic anhydride. The catalyst is removed as in Example 2 above. The adduct obtained is a straw-colored viscous liquid.

The results of NMR analysis are as follows:

| 0.7–1.9 | δ (multiplet, | oleyl, | 1.00) |
| --- | --- | --- | --- |
| 2.6–2.7 | δ (singlet, | —O$_2$CCH$_2$CH$_2$CO$_2$—, | 0.68) |
| 3.5–3.9 | δ (multiplet, | —CH$_2$OCH$_2$—, | 3.18) |
| 4.1–4.5 | δ (multiplet, | —CH$_2$OCO$_2$CH$_2$—, | 2.94) |

$\overline{M}_n$=618, $\overline{M}_w$=906, PDI=1.47. Titration: 0.762 meq CO$_2$H/g.

EXAMPLE 7

Reaction Product of EC:n-Dodecanol (5:1) Adduct With Succinic Anhydride

A portion of sample E (35.00 g, 0.1027 mol hydroxyl) from Example 1 above, succinic anhydride (10.27 g, 0.1027 mol) and sodium stannate trihydrate (0.45 g, 1.0 wt %) are heated at 120° C. for 1 hour. Proton NMR analysis indicates complete anhyride conversion. The catalyst is removed as in Example 2 above. The adduct is a straw-colored low viscosity liquid.

The results of NMR analysis are as follows:

| 0.7–1.9 | δ (multiplet, | CH$_3$(CH$_2$)$_{10}$—, | 1.0) |
| --- | --- | --- | --- |
| 2.6–2.7 | δ (singlet, | —O$_2$CCH$_2$CH$_2$CO$_2$—, | 1.02) |
| 3.6–3.9 | δ (multiplet, | —CH$_2$OCH$_2$—, | 2.6) |
| 4.1–4.5 | δ (multiplet, | —CH$_2$OCO$_2$CH$_2$—, | 2.2) |

$\overline{M}_n$=405, $\overline{M}_w$=500, PDI=1.23. Titration: 2.540 meq CO$_2$H/g.

EXAMPLE 8

Reaction Product EC:n-Dodecanol (20:1) Adduct With Succinic Anhydride

A portion of sample G (26.19 g, 0.0353 mol hydroxyl) from Example 1, succinic anhydride (3.53 g, 0.0353 mol) and sodium stannate trihydrate (0.29 g, 1.0 wt %) are heated at 120° C. for 1 hour. Proton NMR spectral analysis indicates complete anhydride conversion. The catalyst is removed as in Example 2 above. The adduct obtained is a straw-colored viscous liquid.

The results of NMR analysis were as follows:

| 0.7–1.9 | δ (multiplet, | CH$_3$(CH$_2$)$_{10}$—, | 1.0) |
| --- | --- | --- | --- |
| 2.6–2.7 | δ (singlet, | —O$_2$CCH$_2$CH$_2$CO$_2$—, | 1.21) |
| 3.6–3.9 | δ (multiplet, | —CH$_2$OCH$_2$—, | 10.6) |
| 4.1–4.5 | δ (multiplet, | —CH$_2$OCO$_2$CH$_2$—, | 8.7) |

$\overline{M}_n$=868, $\overline{M}_w$=1,730, PDI=1.99. Titration: 1.221 meq CO$_2$H/g.

EXAMPLE 9

Reaction Product of EC:n-Butanol (25:1) Adduct with Succinic Anhydride

Ethylene carbonate (213.63 g, 2.425 mol), n-butanol (7.19 g, 0.0970 mol) and sodium stannate trihydrate (2.20 g, 1.0 wt %) are combined in the reaction system used in Example 4 above. The reaction vessel is heated for 49 hours at 150° C., resulting in 90.0% EC conversion, 24.0 wt % CO$_2$. Succinic anhydride (9.70 g, 0.097 mol) is added and the reaction mixture heated at 120° C. for one hour. Proton NMR analysis indicates complete conversion of succinic anhydride. The catalyst is then removed as in Example 2 above. The adduct is a straw-colored liquid.

The results of NMR analysis are as follows:

| 0.7–1.9 | δ (multiplet, | CH$_3$(CH$_2$)$_2$—, | 1.0) |
| --- | --- | --- | --- |
| 2.6–2.7 | δ (singlet, | —O$_2$CCH$_2$CH$_2$CO$_2$—, | 1.0) |
| 3.6–3.9 | δ (multiplet, | —CH$_2$OCH$_2$—, | 19.0) |
| 4.1–4.5 | δ (multiplet, | —CH$_2$OCO$_2$CH$_2$—, | 15.2) |

$\overline{M}_n$=755, $\overline{M}_w$=2,274, PDI=3.01. Titration: 0.493 meq CO$_2$H/g.

EXAMPLE 10

Reaction Product of EC:n-Octanol (10:1) Adduct with Phthalic Anhydride

Ethylene carbonate (174.78 g, 1.9843 mol), n-octanol (25.84 g, 0.1984 mol) and sodium stannate trihydrate (2.00 g, 1.0 wt %) are combined in the same apparatus used in Example 4 above. The reaction vessel is heated for 16 hours at 150° C., resulting in an EC conversion of 94.5%. Phthalic anhydride (29.33 g, 0.198 mol) is added and the reactants are heated for five hours at 120° C. The catalyst is then removed as in Example 2 above. The adduct is a straw-colored viscous liquid.

The results of NMR analysis are as follows:

| 0.7–1.9 | δ (multiplet, | CH$_3$(CH$_2$)$_6$—, | 1.0) |
| --- | --- | --- | --- |
| 3.5–4.0 | δ (multiplet, | —CH$_2$OCH$_2$—, | 5.73) |
| 4.1–4.5 | δ (multiplet, | —CH$_2$OCO$_2$CH$_2$—, | 4.55) |
| 7.5–8.0 | δ (multiplet, | aromatic, | 0.99 |

$\overline{M}_n$=879, $\overline{M}_w$=1,025, PDI=1.92. Titration: 1.021 meq CO$_2$H/g.

Selected property data and surfactant profiles corresponding to the above examples have been summarized in Table 3 hereinbelow.

TABLE 3
SURFACTANT PROPERTIES PROFILE

| Sample | Initiator | EC.:Init. Ratio | Wt % $CO_2$ Before Anhydride Reaction | Anhydride | Meq $CO_2H/g$ | Surface Tension[a] (dynes/cm) | Wetting Time[b] (Min) | Initial Foam Height[c] (mm) | Foam Stability (% After 5 Min) |
|---|---|---|---|---|---|---|---|---|---|
| Ex. 4 | n-butanol | 10:1 | 26.9 | Succinic | 1.159 | 43.4 | >60 | 10 | 0 |
| Ex. 9 | n-butanol | 25:1 | 24.0 | Succinic | 0.493 | 46.5 | 108 | 22 | 18 |
| Ex. 2 | n-octanol | 10:1 | 23.4 | Succinic | 1.105 | 33.6 | 11 | 33 | 30 |
| Ex. 5 | n-octanol | 10:1 | 23.8 | Maleic | 1.028 | 34.3 | 13 | 40 | 70 |
| Ex. 10 | n-octanol | 10:1 | 22.2 | Phthalic | 1.021 | 33.1 | 15 | 30 | 40 |
| Ex. 7 | n-dodecanol | 5:1 | 15.7 | Succinic | 2.540 | 36.0 | 6.5 | 130 | 85 |
| Ex. 3 | n-dodecanol | 10:1 | 21.2 | Succinic | 1.103 | 36.9 | 20 | 90 | 78 |
| Ex. 8 | n-dodecanol | 20:1 | 25.7 | Succinic | 1.221 | 44.0 | 22 | 130 | 77 |
| Ex. 6 | oleyl alcohol | 10:1 | 20.3 | Succinic | 0.762 | 37.2 | 7 | 32 | 50 |

[a]Ammonium Salt, 0.1% in water
[b]Modified Draves-Clarkson Test
[c]Ross-Miles Test

EXAMPLE 11

Reaction Product of a Poly(ethylene carbonate) polyol with n-Octadecylmercaptan and Succinic Anhydride A poly(ethylene carbonate) polyol ($\overline{M}_n$ of 2076), 27.4 wt % $CO_2$) is prepared from ethylene oxide and carbon dioxide using diethylene glycol as initiator.

A sample of the poly(ethylene carbonate) polyol (100.1 g), n-octadecylmercaptan (17.19 g) and sodium stannate trihydrate (0.59 g) are combined in the same equipment used in Example 4. The flask is heated for 5 hours at 175° C. On cooling to ambient temperature, the product (113.5 g) is a white wax ($\overline{M}_n$ 1457).

A portion of the white wax (81.3 g, 0.0792 mol) and succinic anhyride (7.92 g, 0.0792 mol) are combined and heated for one hour at 120° C. in the same equipment as used above. Size exclusion chromatography shows 100% succinic anhydride conversion. Proton NMR is consistent with the expected structure. Surface tension is 46.5 dynes/cm (0.1% aqueous solution of the ammonium salt; 23° C.).

This example shows that mercaptans can be used to make the novel compositions of this invention.

EXAMPLE 12

Reaction Product of a Poly(ethylene carbonate) Polyol with n-Dodecylamine and Succinic Anhydride A sample of the same poly(ethylene carbonate) polyol used in Example 11 (100.2 g) and n-dodecylamine (27.80 g) are combined in the same equipment used in Example 4. The flask is heated for 6 hours at 125° C. On cooling to ambient temperature, the product (122.9 g) is a white wax ($\overline{M}_n$ 1019).

A portion of the white wax (89.3 g, 0.185 mol end groups) and succinic anhydride (18.4 g, 0.185 mol) are combined and heated for one hour at 120° C. in the same equipment as used above. Size exclusion chromatography shows 100% succinic anhydride conversion.

NMR spectographic data are as follows:

| 0.7–1.6 | δ (multiplet, | $CH_3(CH_2)_{10}$—, | 1.0) |
| 2.6–2.8 | δ (singlet, | —$O_2CCH_2CH_2CO_2$—, | 1.2) |
| 3.4–3.9 | δ (multiplet, | —$CH_2OCH_2$—, | 9.6) |
| 4.0–4.5 | δ (multiplet, | —$CH_2OCO_2CH_2$—, | 3.8) |

Surface tension is 34.4 dynes/cm (0.1% aqueous solution of the ammonium salt; 23° C.).

This example shows that amines can be used to make the novel compositions of this invention.

EXAMPLE 13

Reaction of a Poly(ethylene carbonate) Polyol with n-Hexadecylamine and Succinic Anhydride A sample of the same poly(ethylene carbonate) polyol used in Example 11 (100.3 g) and n-hexadecylamine (27.80 g) are combined in the same equipment used in Example 4. The flask is heated for 6 hours at 125° C. On cooling to ambient temperature, the product (114.4 g) is a white wax ($\overline{M}_n$ of 1657).

A portion of the white wax (82.0 g, 0.1335 mol end groups) and succinic anhydride (13.35 g, 0.1335 mol) are combined and heated for one hour at 120° C. in the same equipment used above. Size exclusion chromatography shows 100% succinic anhydride conversion. Proton NMR spectrographic data are consistent with the expected structure. Surface tension is 40.5 dynes/cm (0.1% aqueous solution of the ammonium salt; 23° C.).

EXAMPLE 14

Reaction Product of an Ethylene Carbonate: n-Hexanol (10:1) Adduct with 2-Dodecen-1-yl Succinic Anhydride Ethylene carbonate (357.3 g, 4.056 mol), n-hexanol (41.44 g, 0.4056 mol) and sodium stannate trihydrate (3.99 g, 1.0 wt %) are combined in the reaction system used in Example 2. The flask is heated for 25.5 hours at 160° C.; 98.0% ethylene carbonate conversion.

A portion of the product formed above (70.0 g, 0.0957 mol OH) and 2-dodecen-1-yl succinic anhydride (28.42 g, 0.0957 mol) are combined and heated for two hours at 120° C. in the same equipment used in Example 11. Proton NMR spectrographic data is consistent with the expected structure. Surface tension is 35.7 dynes/cm (0.1% aqueous solution of the ammonium salt; 23° C.).

This example shows that substituted succinic anhydrides can be used to make the novel compositions of this invention.

EXAMPLE 15

The use of Surfactants of this Invention to Make Water-Based Polyols

A. A modified poly(ethylene carbonate) polyol (70.9 % P-725 modified, $\overline{M}_n$ of 1937, 5.0 g) and water (5.0 g) are combined with thorough agitation. The mixture rapidly settles into two immersible liquid phases. A solution containing the surfactant of Example 3 (0.50 g) as the ammonium salt dissolved in water (1.0 g) is added with thorough agitation. A white emulsion is formed which slowly separates after standing overnight at ambient conditions and is readily redispersible.

The same experiment as above is repeated except that the surfactant of Example 6 (as the ammonium salt) is used instead of the surfactant of Example 3. A white emulsion is formed. Only a small portion separates after standing overnight at ambient conditions and it is readily redispersible.

B. A modified poly(ethylene carbonate) polyol (51.2%, P-725 modified, $\overline{M}_n$ of 2141, 3.0 g) and water (3.0 g) are combined with thorough agitation. The mixture rapidly settles into two immiscible liquid phases when the agitation is removed. A solution containing the surfactat of Example 3 (0.30 g) as the ammonium salt dissolved in water (0.7 g) is added with thorough agitation. A white emulsion is formed which slowly separates after standing overnight at ambient conditions and is eadily redispersible.

C. A modified poly(ethylene carbonate) polyol (27.7%, P-425 modified, $\overline{M}_n$ of 2132, 11.2 g) and water (9.5 g) are combined with thorough agitation. The mixture rapidly separates into two immiscible liquid phases. A solution containing the surfactant of Example 3 (0.56 g) as the ammonium salt dissolved in water (1.5 g) is added thorough agitation. A white emulsion is formed which has a Brookfield viscosity of 300 cps (the Brookfield viscosity of the modified poly(ethylene carbonate) polyol before being converted to a water-based fluid is 14,900 cps). The emulsion separates after standing over night at ambient conditions but is readily redispersible.

D. A poly(propylene glycol) of 2000 molecular weight (10.0 g) and water (10.0 g) are combined with thorough agitation. The mixture rapidly separates into two immiscible liquid phases. A solution containing the surfactant of Example 3 (1.0 g) as the ammonium salt dissolved in water (2.0 g) is added with thorough agitation. A white emulsion is formed which is stable after standing over night at ambient conditions.

E. A diethylene glycol adipate diol of 2000 molecular weight (Formrez 11-56, a product of Witco Chemical Company, 3.3 g) and water (3.3 g) are combined with thorough agitation. The mixture separates into two immiscible liquid phases. A solution containing the surfactant of Example 3 (0.30 g) as the ammonium salt dissolved in water (0.7 g) is added with thorough agitation. A white emulsion is formed which separates after standing overnight at ambient conditions and is readily redispersible.

This example shows that the novel surfactants of this invention are useful for preparing water-based systems of polyether polyols, polyester polyols and modified poly(alkylene carbonate) polyahls.

It is understood that various other modifications will be apparent to and can readily be made by those skilled in the art without departing from the scope and spirit of this invention. Accordingly, it is not intended that the scope of the claims appended hereto be limited to the description as set forth herein, but rather that the claims be construed as encompassing all the features of patentable novelty which reside in the present invention, including all features which would be treated as equivalents thereof by those skilled in the art to which this invention pertains.

What is claimed is:

1. An acid-functional polymer having a poly(alkylene carbonate) backbone and on the average at least about 0.05 and up to one terminal acid group per molecule or a salt thereof.

2. The acid-functional polymer of claim 1 comprising (I) a random poly(alkylene carbonate) polyahl obtained by reacting a monofunctional $C_{4-30}$ alcohol, alcohol alkoxylate, mercaptan, mercaptan alkoxylate, carboxylic acid, carboxylic acid alkoxylte, primary or secondary amine, primary or secondary amine alkoxylate, $C_{3-24}$ alkylphenol or alkylphenol alkoxylate with
    (a) an alkylene carbonate,
    (b) an alkylene oxide and carbon dioxide,
    (c) an alkylene carbonate, alkylene oxide and carbon dioxide or
    (d) a poly(alkylene carbonate) polyahl, and (II) a residue of a donor capable of reacting with said random polyahl to add a terminal acidic group thereto.

3. The polymer of claim 2 wherein the donor capable of reacting with said random polyahl to add a terminal acidic group thereto is selected from the group consisting of cyclic organic acid anhydrides, halo and haloalkyl sulfonic acids, halo and haloalkyl carboxylic acids and inorganic acid anhydrides.

4. The polymer of claim 3 wherein the donor capable of reacting with said random polyahl to add a terminal acidic group is a cyclic organic acid anhydride selected from the group consisting of succinic anhydride, phthalic anhydride and maleic anhydride.

5. The acid-functional polymer of claim 1 in the form of a metal salt, amine salt or ammonium salt.

6. The acid-functional polymer of claim 5 wherein the salt is selected from the group consisting of alkali metal and alkaline earth metal salts, alkyl, cycloalkyl, alkylaryl and aralkyl amine salts, hydroxyalkyl, hydroxycycloalkyl, hyroxyalkylaryl, hydroxyaralkyl amine, and ammonium salts.

7. The acid-functional polymer of claim 1 having the formula $$R^1-(X)_n-(Y)_m-(I)_k-O-A$$

wherein
    $R^1$ is independently in each occurrence a $C_{1-24}$ aliphatic, $C_{6-24}$ cycloaliphatic, a $C_{1-24}$ aliphatic or $C_{6-24}$ cycloaliphatic alkoxylate containing 1-30 alkyleneoxy moieties, a $C_{3-24}$ alkyl substituted phenol or a $C_{1-24}$ hydrocarbon substituted with one or more substituents having oxygen, nitrogen or sulfur,
    X is separately in each occurrence $-ZCOOC(R^2)_2-C(R^2)_2-O-C(R^2)_2-C(R^2)_2-$, wherein Z is separately in each occurrence selected from the group consisting of $-O$, $-S$, $-NH$ or $-NR^3$, wherein $R^3$ is $C_{1-24}$ alkyl,
    Y is separately in each occurrence $-O-C(RHU 2)_2-C(R^2)_2-$, wherein $R^2$ is independently in each occurrence hydrogen, $C_{1-20}$ alkyl, $C_{1-20}$ haloalkyl, $C_{1-20}$ alkenyl or phenyl,
    I is separately in each occurrence the residue of a polyfunctional $C_{2-24}$ aliphatic, $C_{6-30}$ cycloaliphatic or $C_{6-30}$ aromatic alcohol, mercaptan, amine or phenol which optionally also contains one or more oxygen, nitrogen or sulfur,
    m is independently in each occurrence 0 to 200,
    n is independently in each occurrence 1 to 40, and
    k is independently in each occurrence 0 to 8,
    A is an acid functional moiety; with the proviso that X, Y and I are randomly spaced in the polymer backbone.

8. The acid-functional polymer of claim 7 wherein $R^1$ is independently in each occurrence a monovalent $C_{1-20}$ alkane, or $C_{6-20}$ cycloalkane or $C_{6-20}$ alkyl which contains 1–15 alkyleneoxy moieties, substituted with hydrogen or one or more oxygen, nitrogen or sulfur moieties;

$R^2$ is independently in each occurrence hydrogen, halogen, nitro, cyano, $C_{1-20}$ hydroxycarbyl substituted with hydrogen or one or more of halo, cyano, nitro, thioalkyl, tert-amino, $C_{1-18}$ alkoxy, $C_{6-18}$ aryloxy, $C_{7-20}$ aralkoxy, carbonyl dioxy($C_{1-18}$)alkyl, carbonyl dioxy($C_{6-20}$)aryl, carbonyl dioxy($C_{7-20}$)aralkyl, $C_{1-18}$ alkoxy carbonyl, $C_{6-20}$ aryloxycarbonyl, $C_{7-20}$ aralkoxycarbonyl, $C_{1-18}$ alkylcarbonyl, ($C_{6-20}$) aralcarbonyl, $C_{7-20}$ aralkylarbonyl, $C_{1-18}$ alkylsulfinyl, $C_{6-20}$ arylsulfinyl, ($C_{7-20}$) aralkylsulfinyl, $C_{1-18}$ alkylsulfonyl, $C_{6-20}$ arylsulfonyl or $C_{7-20}$ aralkylsulfonyl.

9. The acid-functional polymer of claim 8 wherein
$R^1$ is a monovalent $C_{4-18}$ alkane or $C_{6-18}$ cycloalkane, substituted with hydrogen or one or more oxygen, nitrogen or sulfur groups,
$R^2$ is hydrogen, $C_{1-3}$ alkyl, $C_{2-3}$ alkenyl, or phenyl,
B is an organic carboxylic acid or carboxylic acid salt, and
k is O.

10. The acid-functional polymer of claim 1 having an average moleculr weight between about 200 and 10,000.

11. The acid-functional polymer of claim 10 wherein the average molecular weight is between about 200 and 3000.

12. An acid-functional poly(alkylene carbonate) polyahl prepared by a process comprising
reacting a random non-ionic poly(alkylene carbonate) polyahl obtained by reacting a monofunctional ($C_4$-$C_{30}$) alcohol, carboxylic acid, primary or secondary amine, mercaptan, ($C_3$-$C_{24}$) alkyl phenol or alkoxylates thereof with
(a) an alkylene carbonate,
(b) an alklene oxide and $CO_2$,
(c) an alkylene oxide, an alkylene carbonate and $CO_2$, or
(d) a poly(alkylee carbonate) polyahl, to obtain a random non-ionic poly(alkylene carbonate) polyahl,
admixing a compound capable of reacting with the reaction product to add a terminal acidic group thereto; the proportion of said random non-ionic poly(alkylene carbonate) polyahl to said compound between about 20:1 and 1:1.

13. A stable water-based emulsion or dispersion comprising
a surfactant composition comprising between about 5 weight percent and 95 weight percent of the polyahl of claim 1, and
between about 95 weight percent and 5 weight percent of a non-ionic polymer; and
one or more materials selected from the group consisting of polyether polyahls, polyester polyahls and poly(alkylene carbonate) polyahls.

14. The polymer of claim 2 wherein the terminal acidic group is —COOH, —$SO_2H$, —$SO_3H$, —$SO_4H$, —$PO_4H_2$, —$PO_3H_2$ or sulfosuccinate.

* * * * *